United States Patent [19]

Otsuki et al.

[11] 4,453,700

[45] Jun. 12, 1984

[54] FLUID CONTROL VALVE ASSEMBLY

[75] Inventors: Hiromi Otsuki, Anjo; Yoshiki Maruchi, Toyohashi; Yukio Kawai, Toyota; Toshihisa Ogawa, Aichi, all of Japan

[73] Assignees: Nippondenso Co., Ltd., Kariya; Toyota Jidosha Kogyo Kabushiki Kaisha, Toyota, both of Japan

[21] Appl. No.: 344,959

[22] Filed: Feb. 2, 1982

[30] Foreign Application Priority Data

Feb. 5, 1981 [JP] Japan .............................. 56-15684[U]

[51] Int. Cl.$^3$ ............................................. F16K 31/02
[52] U.S. Cl. ................................. 251/129; 251/335 B; 123/585
[58] Field of Search .................... 251/129, 331, 335 B; 123/585

[56] References Cited

U.S. PATENT DOCUMENTS

| | | | |
|---|---|---|---|
| 2,331,503 | 10/1943 | Ray | 251/335 B X |
| 2,672,293 | 3/1954 | Ludlow | 251/331 X |
| 2,936,776 | 5/1960 | Veatch | 251/331 X |
| 3,022,039 | 2/1962 | Cone et al. | 251/331 X |
| 3,211,416 | 10/1965 | Billeter et al. | 251/331 X |
| 3,399,695 | 9/1968 | Stehlin | 251/331 X |
| 3,631,882 | 1/1972 | White, Jr. | 251/331 X |
| 3,812,398 | 5/1974 | Kozel et al. | 251/331 |

*Primary Examiner*—William E. Tapolcai
*Attorney, Agent, or Firm*—Cushman, Darby & Cushman

[57] ABSTRACT

A fluid control valve assembly for controlling the flow of fluid passing through a fluid passageway defined in a valve body and having an inlet end and an outlet end. A bellows formed of low tackiness material has fixed one end wall secured to the valve body and the other movable end wall connected to a valve stem. The valve stem is actuated by an actuator to move the other movable end wall of the bellows between a closed position in which the other movable end wall is brought into direct contact with a valve seat located in the fluid passageway and an open position in which the other movable end wall is brought out of engagement with the valve seat.

1 Claim, 1 Drawing Figure

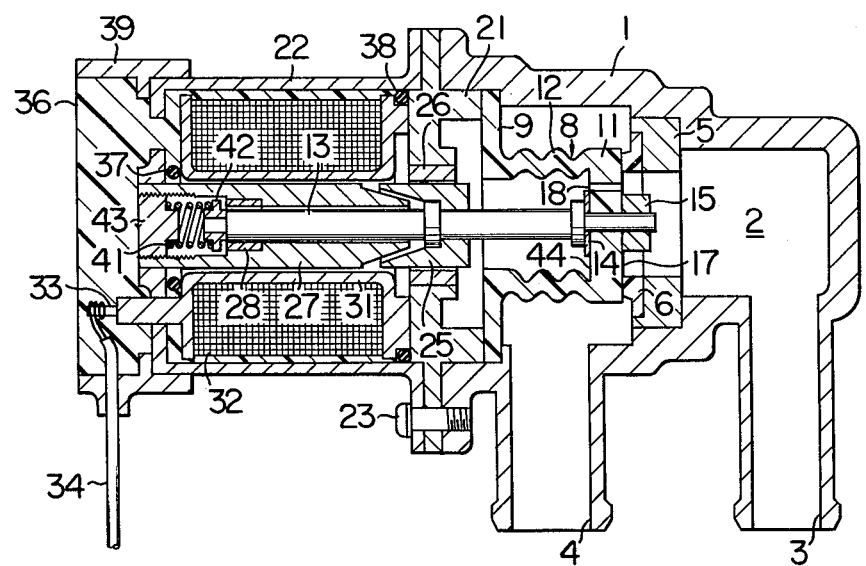

FLUID CONTROL VALVE ASSEMBLY

BACKGROUND OF THE INVENTION (1) Field of the Invention

This invention relates to a fluid control valve assembly suitable for use in controlling the flow of a fluid passing through a fluid passageway.

(2) Description of the Prior Art

In one type of fluid control valve assembly known in the art, a valve member is secured to a valve stem connected to a movable iron core of an electro-magnetic solenoid and is movable toward and away from a valve seat in engagement therewith and in disengagement therefrom, respectively. In this prior art, the valve member or the valve seat is often provided with a resilient member formed as of rubber attached thereto for improving the sealing ability.

In the aforesaid construction, when no current is applied to the solenoid, the valve member is forced against the valve seat by the biasing force of a spring. When the valve member is kept in engagement with the valve seat over a prolonged period of time, there is the risk that they become stuck due to heat, moisture or foreign matter contained in the fluid. This tendency is increased particularly when the valve member or the valve seat has a resilient member formed as of rubber attached thereto. Thus, this type of fluid control valve assembly has had a disadvantage in that even if a current is applied to the solenoid, the valve member is prevented from being released from engagement with the valve seat or delayed in being brought out of engagement therewith.

SUMMARY OF THE INVENTION

Accordingly, the invention has as its object the provision of a fluid control valve assembly capable of performing a stable valving action without having its valve member and valve seat got stuck.

According to the invention, there is provided a fluid control valve assembly comprising a valve including a valve body defining therein a fluid passageway having an inlet end and an outlet end, a valve seat located in the fluid passageway, a valve member movable between a closed position in which the valve member engages the valve seat for preventing a fluid from flowing through the fluid passageway from the inlet to the outlet end and an open position in which the valve member is out of engagement with the valve seat for allowing the fluid to flow through the fluid passageway from the inlet end to the outlet end, and a valve stem connected to the valve member; an actuator operatively connected to the valve stem for moving the valve member between the closed and open positions; and the valve member comprising a bellows formed of material of low tackiness and having a fixed one end wall secured to the valve body and the other movable end wall, the valve stem being connected to the other movable end wall, the other movable end wall of the bellows having an end face directly in contact with the valve seat in the closed position and out of contact with the valve seat in the open position.

BRIEF DESCRIPTION OF THE DRAWING

The single drawing is a sectional view of one embodiment of the fluid control valve assembly in accordance with this invention.

DETAILED DESCRIPTION OF THE PREFERRED EMBODIMENT

The fluid control valve assembly in accordance with a preferred embodiment of the invention comprises a valve body 1 defining therein a fluid passageway 2 having an inlet end 3 and an outlet end 4. A valve seat 5 is located in the fluid passageway 2 and secured to the valve body 1. An annular seal member 6 formed of resilient material, such as rubber, is attached to the valve seat 5. A bellows 8 constituting a valve member which is formed of material of low tackiness, such as tetrafluoroethylene, has two end walls, one end wall 9 being fixed and secured to the valve body 1 and the other end wall 11 being movable and connected to a valve stem 13 through a washer 14 and a ring 15. The bellows 8 also has a corrugated hollow cylindrical wall 12 interconnecting the fixed one end wall 9 and the other movable end wall 11 in concentric relation to the valve stem 13. The other movable end wall 11 is movable between a closed position in which it engages the seal member 6 to prevent the fluid from flowing through the fluid passageway 2 from the inlet end 3 to the outlet end 4 and an open position in which it is released from engagement with the seal member 6 to allow the fluid to flow through the fluid passageway 2 from the inlet end 3 to the outlet end 4. The other movable end wall 11 has an end face 17 brought into direct contact with the seal member 6 when in the closed position shown in the drawing. The end face 17 is maintained in communication with the inlet end 3 of the fluid passageway 2 when in the closed position, and the other movable end wall 11 is formed therethrough with a pressure introducing bore 18 for introducing into the hollow cylinder 12 a fluid in contact with the end face 17. The fixed one end wall 9 of the bellows 8 is secured to the valve body 1 through a magnetic plate 21 which is secured to the valve body 1 together with a solenoid yoke 22 through screws 23. The magnetic plate 21 has secured to its central portion a bushing 26 for supporting a movable iron core 25, and the solenoid yoke 22 has secured to its central portion a fixed iron core 27 driven fitted therein. The fixed iron core 27 has secured thereto a bushing 28 for supporting the valve stem 13 which is supported by the bushing 28 and the bushing 26 supporting the movable iron core 25. Surrounding the fixed iron core 27 is a bobbin 31 having a coil 32 wound therearound and connected to leads 34 through a terminal 33. Filled in the gap between the yoke 22 and the bobbin 31 and coil 32 is an epoxy base resin 36 which serves to isolate the coil 32 from atmosphere. O-rings 37 and 38 are mounted for preventing the resin 36 from flowing into the bobbin 31. A cover 39 is provided to prevent the resin 36 from flowing to outside when it is filled in the gap and also to serve as a grommet for the leads 34. A spring retainer 42 is rotatably mounted on the end portion of the valve stem to retain one end of a spring 41. The spring 41 is mounted for urging the valve stem 13 against the valve seat 5 by its biasing force. The fixed iron core 27 has threadedly engaged with its end portion an adjusting screw 43 for supporting the other end of the spring 41. The other movable end wall 11 of the bellows 8 has a face 44 opposite the end face 17 which has an effective pressure receiving area equal to that of the end face 17 surrounded by the seal member 6.

In the aforesaid construction, when a current is applied to the coil 32 through the leads 34, a magnetic field forms a loop extending from the fixed iron core 27 through the yoke 22, magnetic plate 21 and movable iron core 25 back to the fixed iron core 27 again, to produce an attracting force between the movable iron core 25 and the fixed iron core 27. By this attracting force, the movable iron core 25, the valve stem 13 and the other movable end wall 11 of the bellows 8 are moved to positions in which balance is achieved between the attracting force and the biasing force of the spring 41, to allow the fluid to flow from the inlet end 3 to the outlet end 4 through an annular gap between the end face 17 of the other movable end wall 11 and the seal member 6. By increasing the value of the current applied to the coil 32, it is possible to increase the attracting force to move the positions of the parts in which the attracting force and the biasing force of the spring 41 balance. In this way, the flow area of the gap between the end face 17 and the seal member 6 can be varied in proportion to the value of the current, to thereby vary the flow rate of the fluid flowing from the inlet end 3 to the outlet end 4.

The pressure of the fluid upstream of the valve seat 5 is led through the pressure introducing bore 18 to the hollow interior of the cylindrical wall 12 of the bellows 8, to act on the surface 44 of the other movable end wall 11 to force the end face 17 against the seal member 6. At the same time, the pressure of the fluid upstream of the valve seat 5 acts directly on the end face 17 to move the other movable end wall 11 away from the seal member 6. The forces exerted by the fluid on the opposite end faces 17 and 44 cancel each other out. Also, the pressure of the fluid downstream of the valve seat 5 acts on the outer periphery of the corrugated cylindrical wall 12 of the bellows 8. However, the axial force acting on one of the opposite sides of each corrugation in the cylindrical wall 12 due to the fluid pressure downstream of the valve seat 5 is equal to the axial force acting on the other side of each corrugation, and substantially no axial force is exerted on the bellows 8 due to the fluid pressure downstream of the valve seat 5. Thus, the influences on the opening and closing action of the valve due to the fluid pressure are eliminated. In addition, the bellows 8 of low tackiness is brought into and out of contact with the seal member 6, to thereby prevent the other movable end wall 11 and the seal member 6 from getting stuck. Thus, the flow area of the gap between the end face 17 of the other movable end wall 11 and the seal member 6 can be correctly controlled by varying the value of the current applied to the coil 32. If the valve member is conical in form as is in the prior art, a variation in the position of the conical valve member has caused a change to occur in the effective pressure receiving area of the valve member. Accordingly, even if the pressure differential across the valve member remains constant, a force tending to move the valve member due to the pressure differential undergoes a change, to thereby affect the control effected to adjust the opening of the valve. In the present invention, this disadvantage of the prior art can be eliminated. Since the end face 17 of the bellows 8 serving as a valve member is planar, the effective pressure receiving area of the valve member can be kept constant irrespective of a lift, so that no influences are exerted on the control effected to adjust the opening of the valve by the shape of the valve member.

The fluid control valve assembly according to the invention is suitable for use as a control valve assembly operative to introduce air from atmosphere to the intake system of an engine. The use of the fluid control valve assembly of the instant invention for this purpose enables control of the volume of air supplied to the engine to be effected by varying the value of a current applied to the coil in accordance with various engine conditions.

In the embodiment shown and described hereinabove, a solenoid has been described as being used as an actuator. It is to be understood, however, that the invention is not limited to this specific form of the actuator, and that any other known type of actuator (such as a diaphragm type actuator) may be used with the same results.

The invention enables the following results to be achieved:

(1) The use of a bellows as a valve member enables the number of parts of a valve assembly to be reduced to a greater degree than in a valve assembly in which a bellows is merely added to the valve assembly.

(2) The use of a low tackiness material for forming the bellows enables sticking thereof to the seal member to be avoided.

(3) The influences that might otherwise be exerted on the valving action by the pressure of the fluid can be eliminated by using a bellows as a valve member.

(4) By virtue of the effects achieved as described in paragraphs (2) and (3) above, it is possible for the fluid control valve assembly to perform a stable valving action.

What is claimed is:

1. A proportional electro-magnetic fluid control valve assembly for controlling intake air flow into an engine, comprising:
a valve including a valve body defining therein a fluid passageway having an inlet end and an outlet end, a valve seat located in said fluid passageway, a valve member movable between a closed position in which said valve member engages said valve seat for preventing a fluid from flowing through said fluid passageway from said inlet end to said outlet end and an open position in which said valve member is out of engagement with said valve seat for allowing the fluid to flow through said fluid passageway from said inlet end to said outlet end, and a valve stem connected to said valve member;
an actuator operatively connected to said valve stem for moving said valve member between said closed and open positions;
said valve member comprising a bellows formed of tetrafluoroethylene having low tackiness, said bellows having two end walls one fixedly secured to said valve body and the other being movable, said valve stem being connected to said other movable end wall, said other movable end wall having a free end face directly in contact with said valve seat when said valve member is in said closed position and out of contact with the valve seat in said open position;
an annular seal member of resilient material secured to said valve seat and located between said valve seat and said other movable end wall of said bellows, said free end face being in direct contact with said annular seal member when said valve member is in said closed position;
said bellows including a hollow corrugated cylindrical wall extending between said fixed and said movable end walls in concentric relation to said valve stem, said movable end wall being formed with an opening therethrough to allow a fluid in contact with said free end face to be introduced into the interior of said hollow cylindrical wall;

said opening being communicated with the inlet end of said fluid passageway when said valve member is in said closed position;

said other movable end wall having an inner face opposite said free end face thereof, said inner face having its effective pressure receiving area equal to that of said free end face exposed to inlet pressure when said valve member is in said closed position; and said actuator comprising a movable iron core secured to said valve stem, a fixed iron core secured to said valve body and a coil wound around said fixed iron core, said movable iron core being movable in proportion to a current value applied to said coil to proportionally move said movable end wall of said bellows between said closed and open positions.

* * * * *